United States Patent [19]

Akatsuka

[11] Patent Number: 5,274,621
[45] Date of Patent: Dec. 28, 1993

[54] INFORMATION RECORDING/REPRODUCTION APPARATUS

[75] Inventor: Yuichiro Akatsuka, Tokyo, Japan

[73] Assignee: Olympus Optical Co., Ltd., Tokyo, Japan

[21] Appl. No.: 871,239

[22] Filed: Apr. 20, 1992

[30] Foreign Application Priority Data

Apr. 26, 1991 [JP] Japan .................. 3-097541

[51] Int. Cl.[5] .............................. G06K 13/00
[52] U.S. Cl. ........................ 369/116; 369/54; 235/475
[58] Field of Search ............ 369/116, 53, 54, 258, 369/77.2; 360/2; 235/475, 482

[56] References Cited

U.S. PATENT DOCUMENTS

| | | | |
|---|---|---|---|
| 4,751,394 | 6/1988 | Matsuoka et al. | 250/561 |
| 4,825,059 | 4/1989 | Kurihara et al. | 235/483 |
| 4,912,697 | 3/1990 | Enari et al. | 369/116 |
| 4,937,684 | 6/1990 | Kurihara et al. | 360/2 |
| 5,192,858 | 3/1993 | Sakurada | 235/475 |

FOREIGN PATENT DOCUMENTS

| | | |
|---|---|---|
| 0478329A1 | 4/1992 | European Pat. Off. . |
| 58-40878 | 3/1983 | Japan . |
| 61-253651 | 11/1986 | Japan . |
| 3-122835 | 5/1991 | Japan . |

*Primary Examiner*—Paul M. Dzierzynski
*Assistant Examiner*—Kiet T. Nguyen
*Attorney, Agent, or Firm*—Frishauf, Holtz, Goodman & Woodward

[57] ABSTRACT

An information recording/reproduction apparatus comprises an insertion opening into which an optical recording medium is inserted, a detector for detecting that the optical recording medium is inserted into the insertion opening, a table on which the optical recording medium is placed, an optical head for recording information on the optical recording medium placed on the table, and recording power controller for correcting the recording power of a laser beam emitted from the optical head after the detector generates a detection signal and before the optical recording medium is carried to a position in which the laser beam is emitted from the optical head.

8 Claims, 3 Drawing Sheets

INFORMATION RECORDING/REPRODUCTION APPARATUS

BACKGROUND OF THE INVENTION

1. Field of the Invention

The present invention relates to an information recording/reproduction apparatus for recording/reproducing information using an optical recording medium such as an optical card and, more particularly, to an information recording/reproduction apparatus having a device for detecting recording power of a laser beam when information is recorded and controlling a power of the laser beam.

2. Description of the Related Art

In a conventional information recording/reproduction apparatus for recording/reproducing information using an optical recording medium such as an optical card, a laser beam is emitted from a semiconductor laser is concentrated by a condenser to form an optical spot. The optical spot traces a number of information tracks arranged in parallel to one another in a predetermined region on the surface of the optical card, whereby recording/reproducing of information is performed.

It is known that the ratio of output power to drive current in the semiconductor laser varies with its surrounding temperature, secular changes or the like. In the conventional information recording/reproduction apparatus, therefore, output power of a laser beam is detected and compared with predetermined target power, and a difference between them is fed back to a drive circuit for driving the semiconductor laser to stably output a laser beam having power approximate to the target power.

Published Unexamined Japanese Patent Application No. 58-40878 discloses a method of detecting a change in characteristics of a semiconductor laser and controlling output power of the semiconductor laser. This method considerably facilitates the control of the output power of the semiconductor laser since the output power is usually set to a fixed value when data is read in. However, when data is written in (recorded), an output of the semiconductor laser is usually modulated. For this reason, there occurs a drawback in which the output of the semiconductor laser cannot be controlled unless a circuit for detecting recording power is large in size in order to detect the recording power during the recording of data. Further, there occurs another drawback in which, if the output power of an optical head is changed to recording power in a direct-current manner when an optical card is set, the optical card will be damaged.

To eliminate the above drawbacks, Published Unexamined Japanese Patent Application No. 61-253651 discloses a technique of moving an optical head outside a recording region of an optical recording medium, emitting a laser beam under recording power in a direct-current manner, and detecting the recording power. Since, however, the optical head has to move outside the recording region, it takes more time to control the recording power.

Applicant proposes in Published Unexamined Japanese Patent Application No. 3-122835 discloses a method of making an amount of radiation per unit of area on a recording medium smaller than that in recording of data so that recording power can be generated without moving an optical head outside a recording region, thereby to prevent the recording medium from being damaged. It is however necessary to reset tracking or focusing after the recording power is detected, and additional time therefor is required.

SUMMARY OF THE INVENTION

An object of the present invention is to provide an information recording/reproduction apparatus having a device capable of detecting output power of a laser beam for a short period of time when information is recorded, without damaging a recording medium, and controlling the output power.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An information recording/reproduction apparatus according to an embodiment of the present invention will now be described in a specific manner, with reference to the accompanying drawings.

Figure 1:
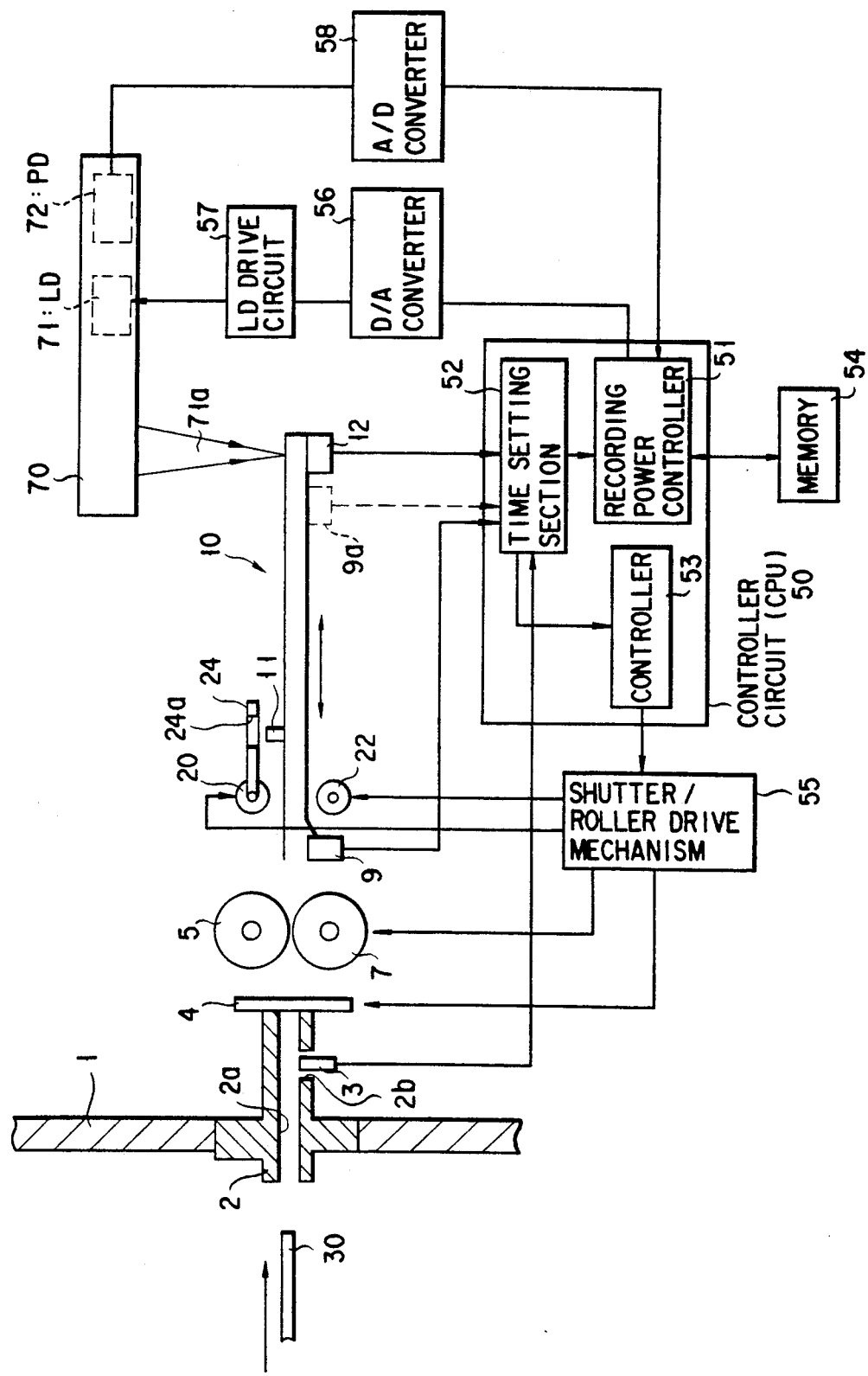
FIG. 1 is a view showing the structure of an information recording/reproduction apparatus having a device for controlling recording power of a laser beam according to an embodiment of the present invention.
Figure 2:
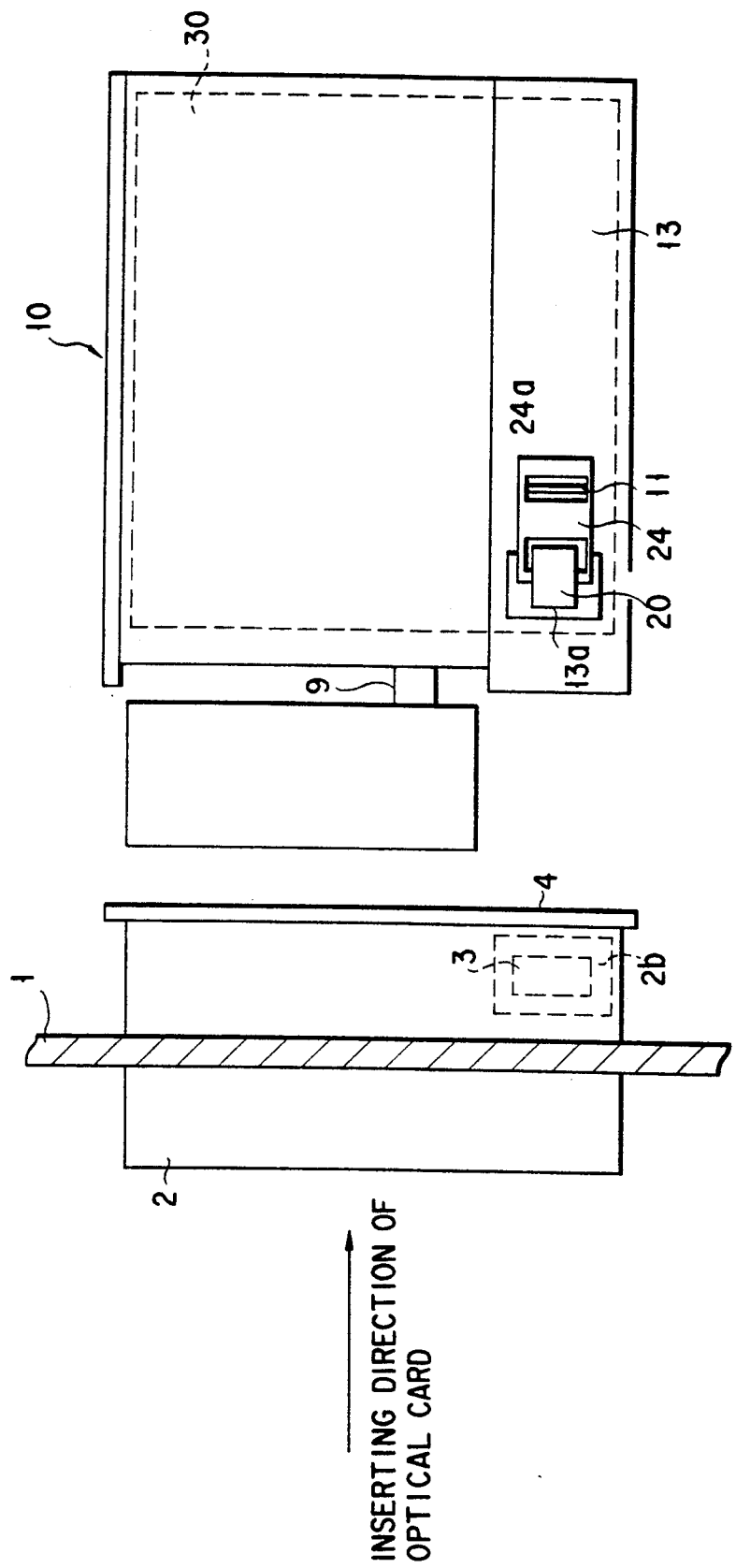
FIG. 2 is a top view of the information recording/reproduction apparatus shown in FIG. 1.

Referring to FIG. 1 and FIG. 2, a front 1 of the information recording/reproduction apparatus includes a card insertion portion 2 having an insertion opening 2a through which an optical card 30 serving as an optical recording medium is inserted in the direction of the arrow. The card insertion portion 2 has a hole 2b which is formed halfway in an insertion path of the optical card 30, and a first detector 3 is arranged in the hole 2b to detect that the optical card 30 has been inserted.

A shutter 4 having a width which is virtually equal to that of the insertion opening 2a, is attached to the end of the card insertion portion 2 to prevent dust from entering the apparatus through the insertion opening 2a. The shutter 4 is always urged above by an urging means (not shown), and normally urged to close the insertion opening 2a as shown in FIG. 1. When the first detector 3 detects insertion of the optical card 30, a solenoid (not shown) is driven to open the shutter 4.

A drive roller 7 for carrying the inserted optical card to a table 10, described later, is arranged behind the shutter 4. A cleaning roller 5 is arranged above the drive roller 7 and urged toward the drive roller 7 by the urging means (not shown). The optical card 30 is thus inserted through the insertion opening 2a, then moved between the cleaning and drive rollers 5 and 7 through the shutter 4, and carried to the table 10 by rotation of a drive roller 7. An information recording surface of the optical card 30 is cleaned by the cleaning roller 5.

The table 10, which serves to place the carried optical card thereon, is supported behind the rollers 5 and 7 by a supporting means (not shown) so that it can be moved in the directions of the arrows shown in FIG. 1. The table 10 is arranged just behind the rollers 5 and 7, as shown in FIG. 1, when the optical card 30 is charged on the table 10 and discharged from the table 10. Furthermore, a second detector 9 capable of detecting that the optical card 30 is charged on the table 10. The second detector 9 is not necessarily essential to the present invention.

As shown in FIG. 2, the table 10 includes a lower plate urged above, and a holding member 13 arranged in parallel with the lower plate so as to have a space virtually equal to the thickness of the optical card. The optical card is placed on the lower plate of the table 10, and urged above to bring one end of the optical card into contact with the holding member 13. In FIG. 2, the optical card 30 placed on the table 10 is indicated by the dotted line.

A press roller 20 and a drive roller 22 are arranged away from the top and the underside of the holding member 13 at the leading edge, respectively. A hole 13a is formed in the holding member 13 so that these rollers 20 and 22 can be made close to each other. Further, a hole (not shown) for the drive roller 22 is formed in the lower plate on which the optical card is placed. When the table 10 is positioned as shown in FIG. 1, these rollers 20 and 22 are driven so as to approach each other or separate from each other in the hole 13a.

A fixed plate 24 is connected to the press roller 20, and a hole 24a is formed in the fixed plate 24 so that a lock pin 11 formed on the holding member 13 can be engaged with the fixed plate 24. When the press roller 20 and drive roller 22 come close to each other, the table 10 is locked to stop moving in the directions of the arrow. The optical card is carried to or transferred from the table 10 if the drive roller 22 is driven in this locked state. In other words, when the optical card is carried to or transferred from the table 10, the table 10 is always locked.

FIG. 1 shows the table 10 which is unlocked.

A third detector 12 is arranged at the rear edge of the table 10 to detect whether the optical card is normally placed on the table 10. Either a mechanical sensor or an optical sensor can be used for the detectors 3, 9 and 12.

The optical card is carried by the drive rollers 7 and 22 and, when it is normally placed on the table 10, the press roller 20 and drive roller 22 are separated from each other, with the result that the table 10 is unlocked. The table 10 on which the optical card is placed, is then moved in the directions of the arrow in FIG. 1 by a drive mechanism (not shown). An optical head 70 is supported above the table 10 and can be moved in a direction perpendicular to the surface of paper. The optical head 70 includes an LD 71 for actually generating recording power and a PD 72 for monitoring an amount of the recording power generated from the LD 71.

The optical head 70 is driven in the direction perpendicular to the surface of paper at the same time when the table 10 on which the optical card is placed is moved in the directions of the arrow, the tracks on the optical card are scanned with a laser beam 71a so that record/reproduce of information is performed.

In the above case, the optical head 70 is fixed and the optical card place on the table is moved in the right and left directions in FIG. 1.

However, it may be that the table 10 on which the optical card is placed is fixed and the optical head 70 is moved in the right and left directions relative to the optical card.

The outputs of the detectors 3, 9 and 12 are connected to the input of a controller circuit (CPU) 50. The CPU 50 includes a time setting section 52, and a recording power controller 51 and a shutter/roller drive mechanism controller 53 both of which are supplied with commands from the time setting section 52. The time setting section 52 is supplied with detection signals from the detectors 3, 9 and 12, and then transmits timing signals to the recording power controller 51 at different timings in response to the detections signals. If the detector 9 is eliminated from this apparatus, the time setting section 52 detects a detection signal supplied from the detector 3 and then transmits a timing signal to the recording power controller 51 at a timing which is delayed by a predetermined period of time by a timer. A shutter/roller drive mechanism 55 for driving the shutter 4, drive rollers 7 and 22, and press roller 20 is controlled by a control signal from the controller 53 in response to the command output from the timer setting section 52.

The recording power controller 51 is connected to a memory 54 in which a predetermined amount of laser beam emitted under recording power is stored. A corrected value of the laser driving current corresponds to the recording power, which will be described later, is also stored in the memory 54.

A D/A converter 56 and an LD drive circuit 57 for driving the LD 71 included in the optical head 70, are connected to an output of the recording power controller 51. An amount of light output from the LD 71 is monitored by the PD 72 included in the optical head 70, and an output of the PD 72 is connected to an input of the recording power controller 51 through an A/D converter 58.

An operation for controlling the recording power of the laser beam emitted from the above apparatus, will now be described with reference to FIGS. 1 and 3.

When the optical card 30 is inserted into the insertion opening 2a, the press roller 20 and drive roller 22 are close to each other, and the table 10 is already locked. The first detector 3 detects that the leading edge of the optical card 30 has reached a detection position of the detector 3 and outputs a detection signal. The detection signal is supplied to the shutter/roller drive mechanism controller 53 through the time setting section 52. A control signal of the controller 53 is input to the shutter/roller drive mechanism 55 so that the shutter 4 is opened and the drive rollers 7 and 22 are driven. The controller 53 can be so constituted as to supply the control signal to the drive mechanism 55 in order that the shutter 4 and drive rollers 7 and 22 are simultaneously driven in response to the detection signal of the first detector 3, or in order that they are driven in sequence at regular intervals. The optical card 30 is therefore carried toward the table 10.

In response to the detection signal supplied from the detector 3 to the time setting section 52, the recording power controller 51 is supplied with a signal indicating that the optical card 30 starts to be inserted into the insertion opening. The recording power controller 51 thus starts to emit a laser beam under recording power and correct the recording power. This correcting operation is usually completed before the carried optical card is detected by the second detector 9 and a timing signal is input to the recording power controller 51. If the second detector 9 is eliminated from this apparatus, the correcting operation is completed before a timing signal, which is transmitted from the time setting section 52 after a predetermined period of time after the detection signal of the first detector 3 is detected, is input to the recording power controller 51.

The correcting operation will be described with reference to the flowchart shown in FIG. 3.

When a detection signal is input from the first detector 3 to the time setting section 52, a signal representing that the optical card starts to be inserted, is supplied to the recording power controller 51. The recording power controller 51 reads, from the memory 54, a predetermined value A of drive current required for emitting a laser beam from the LD 71 under recording power (step S1). The LD 71 emits the laser beam by the drive current A (step S2).

The correcting operation of an amount of the laser beam emitted from the LD 71 is started (step S3). This correcting operation continues until the second detector 9 detects the optical card (step S4). The amount of the laser beam emitted from the LD 71 is monitored by the PD 72, and fed back to the recording power controller 51 through the A/D converter 58. When the amount of the laser beam monitored by the PD 72 is smaller than the value A, the drive current is corrected to positive electricity which corresponds to just step value of A+ (steps S5 and S6). When the amount of the laser beam is larger than the value A, the drive current is corrected to negative electricity which corresponds to just step value of A− (steps S7 and S8). This correcting operation is repeated until the amount of the laser beam coincides with the target value. The more the amount of correction, the more the time required for the correcting operation.

A value B of drive current required when the correcting operation is completed, is detected, and a value of B−A is stored in the memory 54 as a corrected value (step S10). In most cases, the correcting operation is completed before the second detector detects the optical card. If time is required for the correcting operation, which is a considerably rare case, error processing is performed (step S12). This error processing is, for example, to supply an error status to a host computer and to display an error on a liquid crystal display.

Since the leading edge of the optical card is carried to the initial light beam collecting position, the optical card may be damaged by the laser beam 71a emitted under recording power. To prevent the damage of the optical card, the power of the LD 71 is lowered to the reproduction power, and a laser beam is emitted (step S11). Needless to say, the power of the LD 71 can be off. The correcting operation is then completed.

When information is actually recorded on the optical card, the corrected value stored in the memory 54 is added to the value A to cause the LD 71 emitting a laser beam. This adding operation is carried out in the recording power controller 51.

As has been described above, the correcting operation is usually completed after the optical card 30 is inserted into the insertion opening 2a and before the second detector 9 detects the optical card. For this reason, under the recording power, the laser beam is emitted to the end of the table on which the optical card is not placed, which does not damage the optical card.

When the leading edge of the optical card reaches the detection position of the third detector 12, and then it is detected that the optical card is placed on the table 10, the detection signal is supplied to the controller 53 through the time setting section 52. The control signal of the controller 53 is input to the shutter/roller drive mechanism 55. Therefore, the drive rollers 7 and 22 are stopped, the shutter 4 is closed, and the drive roller 22 and press roller 20 are separated from each other. Since the press roller 20 is separated from the drive roller 22, the locked state of the table 10 is released.

The table 10 is reciprocated by a predetermined distance in the directions of the arrow shown in FIG. 1. Simultaneously, the optical head is also reciprocated in the direction perpendicular to the surface of paper. While the table 10 and optical head 70 are moving relative to each other, the optical head 70 emits a laser beam to scan the tracks of the optical card, thereby performing a recording or a reproducing or a reproducing operation or the like.

Figure 3:
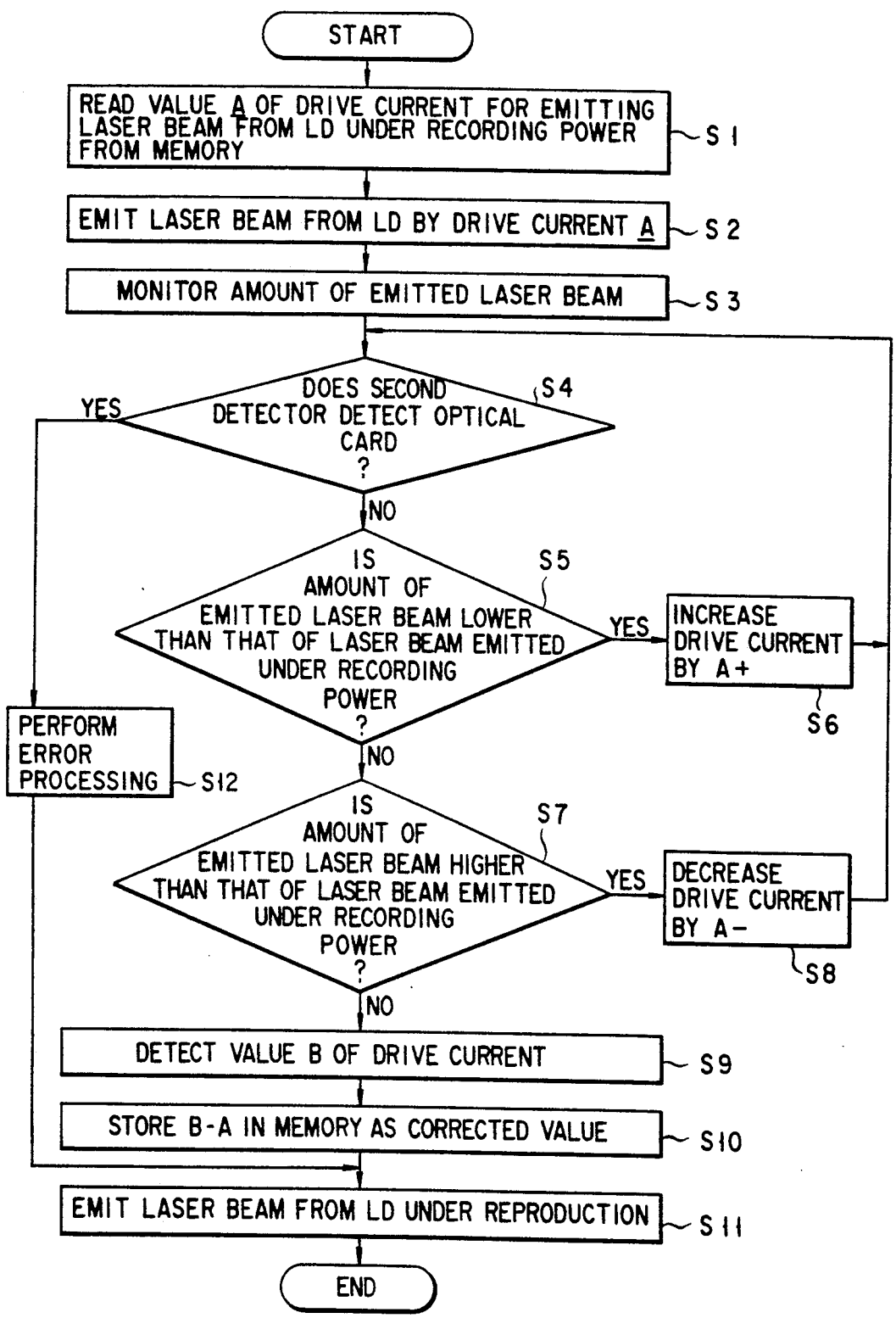
FIG. 3 is a flowchart showing a process of controlling the recording power of the laser beam.

The flowchart of FIG. 3 shows a case where the correcting operation is completed before the detection signal is issued from the second detector 9. In this case, if the second detector 9 is omitted, a step of "starting a timer in the time setting section" is added between the steps S2 and S3. The count value of the timer corresponds to time required until the leading edge of the optical card reaches the initial light beam collecting position of the light beam 71a after the optical card is carried from the position of the detector 3. Further, the step S4 is replaced with a step of "detecting whether the count value of the timer is a predetermined value ?".

The second detector is arranged at the end of the table 10 in the apparatus shown in FIG. 1. However, the present invention is not limited to the position of the second detector. In other words, the correcting operation has only to be performed after the optical card is inserted into the insertion opening 2a and before it is carried to the initial laser beam collecting position. Therefore, as indicated by the dotted line in FIG. 1, a detector 9a can be arranged directly before the initial light beam collecting position to perform a collecting operation before a detection signal of the detector 9a is detected.

Otherwise, if programming of the control system is performed so that the correcting operation can be completed after the first detector 3 issues a detection signal and before the optical card is carried to the initial laser beam collecting position, none of the steps S2, S4 and S12 of the flowchart shown in FIG. 3 are required.

As has been described, in the present invention, the power of a laser beam emitted from the optical head to the optical card while information is being recorded, is corrected to have a target value after the optical card is inserted and before it is carried to the initial laser beam collecting position. It is therefore possible to control the output of the laser beam for a short period of time, without causing the optical card to be damaged.

The embodiment of the present invention has been described in a specific manner. However, the present invention is not limited to the above embodiment, but various changes and modifications can be made. For example, the positions of the first and second detectors, and the method of detecting the optical card can be changed. Furthermore, the present invention can be applied to an information recording/reproduction apparatus using an optical disk.

What is claimed is:

1. An information recording/reproduction apparatus comprising:

an insertion opening for allowing an optical recording medium to be inserted thereinto;

insertion detecting means for detecting that the optical recording medium is inserted into said insertion opening and for generating an insertion signal;

carrying means for carrying the optical recording medium inserted into said insertion opening;

placing means for placing the optical recording medium carried by said carrying means thereon;

an optical head for emitting a laser beam to the optical recording medium placed on said placing means;

power detecting means for detecting recording power of the laser beam emitted from said optical head; and power controlling means for controlling a power of the laser beam in response to the recording power detected by said power detecting means after the insertion signal is generated and before the optical recording medium is carried to a position in which said optical head emits the laser beam.

2. The information recording/reproduction apparatus according to claim 1, wherein said power controlling means includes a recording power controller for correcting the recording power of the laser beam emitted from said optical head to a power required when information is recorded on the optical recording medium.

3. The information recording/reproduction apparatus according to claim 2, wherein said recording power controller includes a CPU, and means for controlling said CPU to control said laser beam so that the correction of the recording power is completed within a predetermined period of time after the insertion signal is generated.

4. The information recording/reproduction apparatus according to claim 2, wherein said recording power controller includes means for making the recording power of the laser beam lower than a reproduction power after the recording power is corrected.

5. The information recording/reproduction apparatus according to claim 1, wherein said power controlling means includes a time setting section for generating a timing signal to stop the controlling operation of the power of the laser beam within a predetermined period of time after the insertion signal is generated.

6. The information recording/reproduction apparatus according to claim 5, wherein said time setting section includes a timer for counting the predetermined period of time after the insertion signal is generated, and said timing signal is generated after said timer counts the predetermined period of time.

7. The information recording/reproduction apparatus according to claim 1, wherein said apparatus further comprises position detecting means for detecting that said optical recording medium remains at a predetermined position until said optical recording medium is moved to a position in which said optical head emits the laser beam, and said power controlling means includes a time setting section for generating a timing signal to stop the controlling operation of the power of the laser beam in response to an output of said position detecting means.

8. The information recording/reproduction apparatus according to claim 7, wherein said position detecting means detects a position in which said optical recording medium is placed on said placing means.

* * * * *